United States Patent [19]

Schaefer

[11] 3,901,583
[45] Aug. 26, 1975

[54] REFLECTIVE ROADWAY MARKER

[75] Inventor: Howard A. Schaefer, Lancaster, Ohio

[73] Assignee: Anchor Hocking Corporation, Lancaster, Ohio

[22] Filed: Oct. 10, 1973

[21] Appl. No.: 404,864

Related U.S. Application Data

[63] Continuation-in-part of Ser. No. 296,947, Oct. 12, 1972.

[52] U.S. Cl. .................................. 350/97; 404/12
[51] Int. Cl.² .......................................... G02B 5/12
[58] Field of Search ............................ 404/9–16; 350/97–109, 61, 65

[56] References Cited
UNITED STATES PATENTS

| | | | |
|---|---|---|---|
| 1,707,432 | 4/1929 | Erickson | 404/16 |
| 2,180,093 | 11/1939 | Persons | 350/106 |
| 2,685,231 | 8/1954 | Onksen | 350/103 |
| 3,332,327 | 7/1967 | Heenan | 350/103 |

FOREIGN PATENTS OR APPLICATIONS

| 804,929 | 11/1958 | United Kingdom | 350/104 |

Primary Examiner—Robert J. Corcoran
Assistant Examiner—Michael J. Tokar
Attorney, Agent, or Firm—Connolly and Hutz

[57] ABSTRACT

A reflective roadway marker includes a body member of internally dished-out construction and with an integral retroreflective optical system in a side wall of the body. The body and optical system are made of tempered glass to provide improved impact strength thereof and to disintegrate should failure occur. The body is tapered to particularly be adapted for pedestrian travel.

5 Claims, 8 Drawing Figures

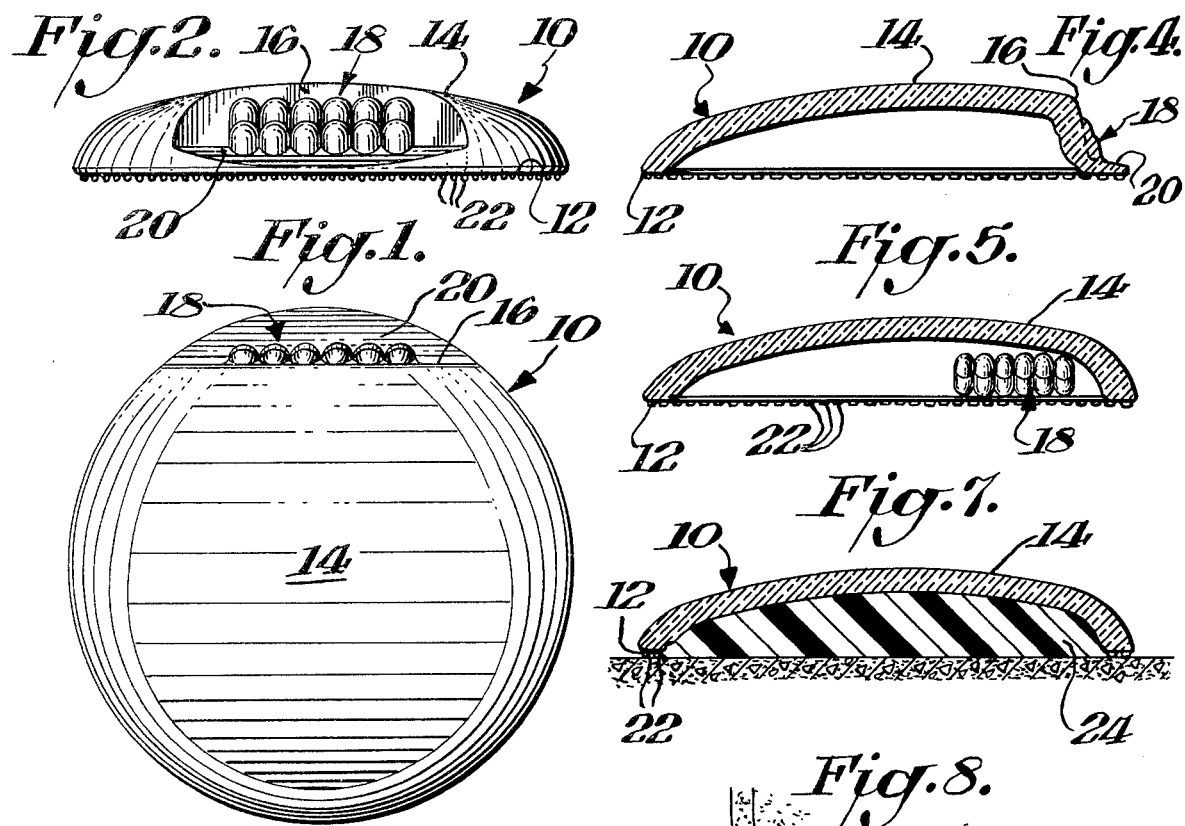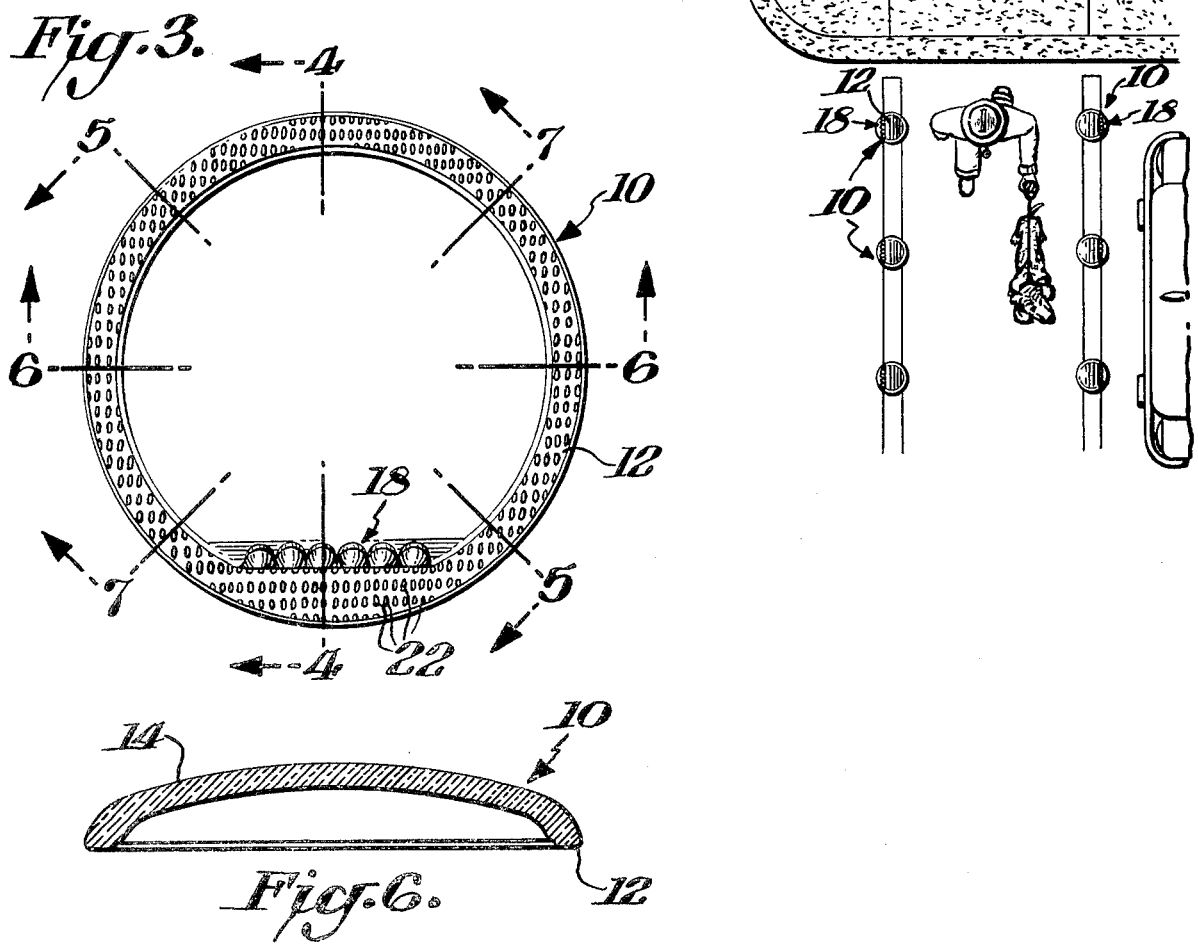

REFLECTIVE ROADWAY MARKER

CROSS-REFERENCE TO RELATED APPLICATION

This application is a continuation-in-part of copending application Ser. No. 296,947; filed Oct. 12, 1972.

BACKGROUND OF THE INVENTION

Reflective markers have long been used in the prior art. Exemplary of such markers are. U.S. Pat. Nos. 3,409,344; 2,991,698; 1,906,655; 1,807,350; 1,671,086; 1,591,572; 3,570,377; 3,519,327; 3,499,371; 3,427,933; 3,373,667; 3,332,327; 3,217,617; 3,216,335; 3,086,431; 2,981,149; 2,941,447; 2,703,038; 2,330,097; 2,303,113; 2,199,996; 2,187,879; 2,174,637; 2,169,674; 2,151,279; 2,126,224; 2,005,170; 1,973,176; 1,966,678; Des. No. 215,376; Des. No. 212,263; Des No. 210,329; Des No. 209,880; Des No. 208,121; Br. Pat. Nos. 1,065,622; 537,453; 301,280; and 278,308.

In general the prior art has taken the following approaches with respect to reflective markers which are secured to the roadway itself: (1) ceramic markers with glass optics; (2) glass optics embedded in plastic markers or (3) plastic optics in a plastic body. These prior art arrangements have numerous disadvantages. For example ceramic markers are not reflective under wet conditions and have a tendency to break on asphalt. Additionally, optics which are embedded in the markers frequently become covered with dirt or other road debris during use which severely hampers their effectiveness. Moreover, plastic markers are not completely satisfactory since plastic looses its color over a period of time and becomes generally grey whereby it is not readily visible during the day. Additionally, the various markers which are painted have a limited life because of the paint wearing off. The prior art markers utilizing non-integral optics are unsatisfactory since these non-integral optics have been found to fall off during usage. Further, ceramic optics are unsatisfactory since in usage the glazed ceramics chip and peel. Moreover, where plastic materials are utilized the life of these materials is generally only about six months whereupon the plastic material becomes mechanically broken up. A further disadvantage with certain prior art markers are that those markers having the optics embedded or shielded cannot provide sufficient angular dispersion or retroreflectivity. A still further disadvantage of various prior art is that the plastic material is affected by the ultraviolet light of the sun which is particularly detrimental in the southern states of the United States with respect to the position of the sun.

Despite the numerous disadvantages with the prior art approaches which rely upon plastic or ceramic materials for the markers, the prior art has never seriously attempted to make the markers out of glass. While the advantages of glass might suggest the desirability of this material because of its highly developed state of technology and because of the effectiveness of glass optics, other physical properties of glass have been considered so detrimental that the prior art has continued to resort to plastics and ceramics. The primary disadvantages of glass are of course the low impact strength generally attendant with this material and the consequent road hazards which would be created upon failure of the material resulting in sharp pieces of glass being placed on or near the roadway.

SUMMARY OF THE INVENTION

An object of this invention is to provide a roadway marker which overcomes the disadvantages of the prior art.

A further object of this invention is to provide a roadway marker of the type disclosed in the parent application which is particularly designed for pedestrian travel.

THE DRAWINGS

FIG. 1 is a top plan view of a roadway marker in accordance with this invention;

FIG. 2 is a front elevation view of the roadway marker shown in FIG. 1;

FIG. 3 is a bottom plan view of the roadway marker shown in FIGS. 1-2;

FIGS. 4-6 are cross-sectional views in elevation taken through FIG. 3 along the lines 4—4, 5—5 and 6—6, respectively;

FIG. 7 is a cross-sectional view in elevation taken through FIG. 3 along the line 7—7 and showing the roadway marker in use; and FIG. 8 is a schematic view showing in use a plurality of roadway markers in accordance with this invention.

DETAILED DESCRIPTION

The principles of this invention are based upon the principles and concepts set forth in parent application Ser. No. 296,947; filed Oct. 12, 1972. Accordingly, the following description will be directed primarily to departures from the disclosures in that parent application. It is to be understood, however, that the details of that application are incorporated herein by reference thereto.

FIGS. 1-7 illustrate a reflective roadway marker in accordance with this invention made of an internally dished-out body member 10 which is of generally circular appearance in its plan view and generally includes a bottom edge 12 which is joined by smoothly tapered top wall 14 and having an abrupt shoulder 16 at one portion thereof to accommodate retroreflective optical system 18 of the type set forth in the parent application. A ledge 20 is disposed below optical system 18. As indicated in the parent application the body and its optical system are of one piece integral construction made of tempered glass to provide improved impact strength and whereby the glass will disintegrate into harmless particles should there be failure.

Bottom wall 12 is provided with stippling 22 and the interior of the body is filled with a potting material 24 in the manner described in the parent application. As indicated in that application various concepts employed therein such as internally coloring the transparent body or coloring the potting compound may be incorporated within the concepts of this invention and the roadway marker functions in generally the same manner as disclosed in the parent application.

In accordance with this invention, however, the generally circular type body member has a slanted top wall which smoothly blends into the bottom wall 12. Other geometric shapes may alternatively be employed. The slanted top wall is not of a uniform taper in that the wall does not uniformly taper from its center point. In this respect the top wall is only slightly tapered or is generally flat from the central portion to the shoulder 16. Conversely, the wall has its steepest taper at a portion diametrically opposite the optical system 18 incorporated in shoulder 16 with the remaining intermediate portions smoothly blending into the flat taper and steepest taper as illustrated, for example in FIGS. 4–7.

Although the parent application broadly applied to a marker which includes either a single optical system or multiple optical systems the present invention illustrates the form of the invention which includes only the single optical system. In use as illustrated in FIG. 8 the markers would, for example, be disposed to delineate pedestrian walkways and would be arranged in such a manner that the optical systems face oncoming traffic with the tapered wall in effect mating with the street. Because of the particular design such markers provide a non-trip feature particularly adapted for pedestrian travel.

In one embodiment of the invention the overall diameter of the marker is, for example, 6 inches with the maximum height between the lower edge of bottom wall 12 and the top of the top wall 12 being 1 inch. The thickness of the body 10 at its center point is, for example, 9/32 inches. The highest point of body 10 may be on center or may be eccentric being at a location between the center and the shoulder 16. It is noted that FIGS. 1–7 are drawn generally to scale and thus accurately illustrate the relative angles, shapes, etc., in the inventive design. In the illustrated embodiment the taper of the top wall as shown in FIG. 4 would be formed by a 9 inch radius having its center offset 0.625 inches from the center of body 10. At the end of the taper, however, a rounded edge is formed which blends into the lower wall 12 by means of a 1 ¼ radius. As viewed from FIG. 2 the front face is formed by the 1 inch radius at each end thereof between the portion of the top wall which blends into the bottom wall. Thus in the illustrated embodiment the tapered top wall is generally formed of uniform radius with an offset center line, the diameter of the body member itself being two-thirds that of the radius which forms the top wall. The radius is also 9 times greater than the maximum height thereby providing sufficient dimension at shoulder 16 to accommodate optical system 18.

As indicated in the parent application the body member is formed integral with the optics from the glass material by tempering the glass material. As further noted in the parent application the body is shaped and the interior thereof colored while the optics are being shielded so that a reflective material may also be applied thereto. Next the body is heated to the softening temperature of approximately 1300°F to automatically fire the ceramic color into the glass. The uniformly heated body is quenched by air or other means in a suitable manner to simultaneously impart high compression strains by applying the proper velocity of air or other fluid from suitable nozzles. Other types of treatment may be practiced to obtain the same end results. Such tempered glass made by this procedure results in a durable marker which survives on the roadway and if an accident occurs the glass will disintegrate into particles which will not cause a traffic hazard. A further advantage with the claimed invention as with that disclosed with the parent application is that the workable retroreflective optics can be pressed integral with the entire marker so as to lend itself for automatic type mass production.

As further indicated in the patent application, the resultant marker with its integral optical system made of tempered glass has an impact strength of at least 10,000 psi and its optical system is exposed for angular dispersions up to a minimum of 20° deviation off-axis of vehicle travel toward the marker. The focal point of the smoothly curved spherical segment lens surface is disposed with respect to its smoothly curved spherical segment reflective surface to assure reflection of the light to the eyes of the driver as the vehicle continues to approach the marker.

What is claimed is:

1. A retroreflective roadway marker comprising a body member, said body member having a peripheral rim and having top and side walls, said body member being of concave internally dished-out construction with an internal cavity exposed at its lower surface, at least one side wall being inclined inwardly from said rim to said top wall, said one side wall including a generally vertical portion extending from said rim to said top wall and disposed for facing oncoming traffic, a retroreflective optical system in said generally vertical portion of said one said wall, said body member and its optical system being integral and made of tempered glass having an impact strength of at least 10,000 psi and which disintegrates into harmless particles upon failure, said optical system being exposed for angular dispersion up to a minimum of 20° deviation off axis of vehicle travel toward said marker, said optical system including a smoothly curved spherical segment lens surface projecting outwardly from said generally vertical portion of its side wall and disposed toward the exterior of said body member for receiving rays of light from the headlight of an approaching vehicle, a smoothly curved spherical segment reflective surface associated with said lens surface and disposed toward the interior of said body for reflecting the light passing through said lens surface, the focal point of said lens surface being disposed with respect to said reflective surface to assure reflection of the light to the eyes of the driver as the vehicle continues to approach the marker, securing means on the lower surface of said rim for mounting said marker directly to the roadway surface without the necessity of partially embedding the marker below the roadway, entirely all of said optical system being disposed above said securing means whereby the entire optical system is disposed above the roadway, said body member being of smooth contour free of any optical system at the portion of said body member diametrically opposite said vertical portion, said top wall merging into said side walls to form a continuous wall being eccentrically shaped in its elevation view with its maximum vertical distance being off center and disposed toward said vertical portion of said one side wall containing said optical system, said continuous wall of said body member being tapered downwardly away from the general area of said optical system and toward said diametrically opposite portion, and said diametrically opposite portion thereby presenting an eccentric sloping surface which minimizes road hazard.

2. A marker as set forth in claim 1 wherein said body member is of generally circular shape in its plan view, a shoulder being formed in said top wall to comprise said generally vertical portion, and said optical system being formed in said shoulder.

3. A marker as set forth in claim 2 wherein the top wall of said body member is formed of generally uniform radius with an offset center point with respect to the center point of said body.

4. A marker as set forth in claim 3 wherein the diameter of said body member is about two-thirds the size of said uniform radius and about six times the maximum heighth of said body member.

5. A marker as set forth in claim 3 wherein said body member includes a rounded edge which blends into its bottom wall and said top wall.

* * * * *